June 28, 1960  J. F. McKAY ET AL  2,942,996
STABILIZING THE VISCOSITY OF OXIDIZED DRYING OILS
Filed July 20, 1956
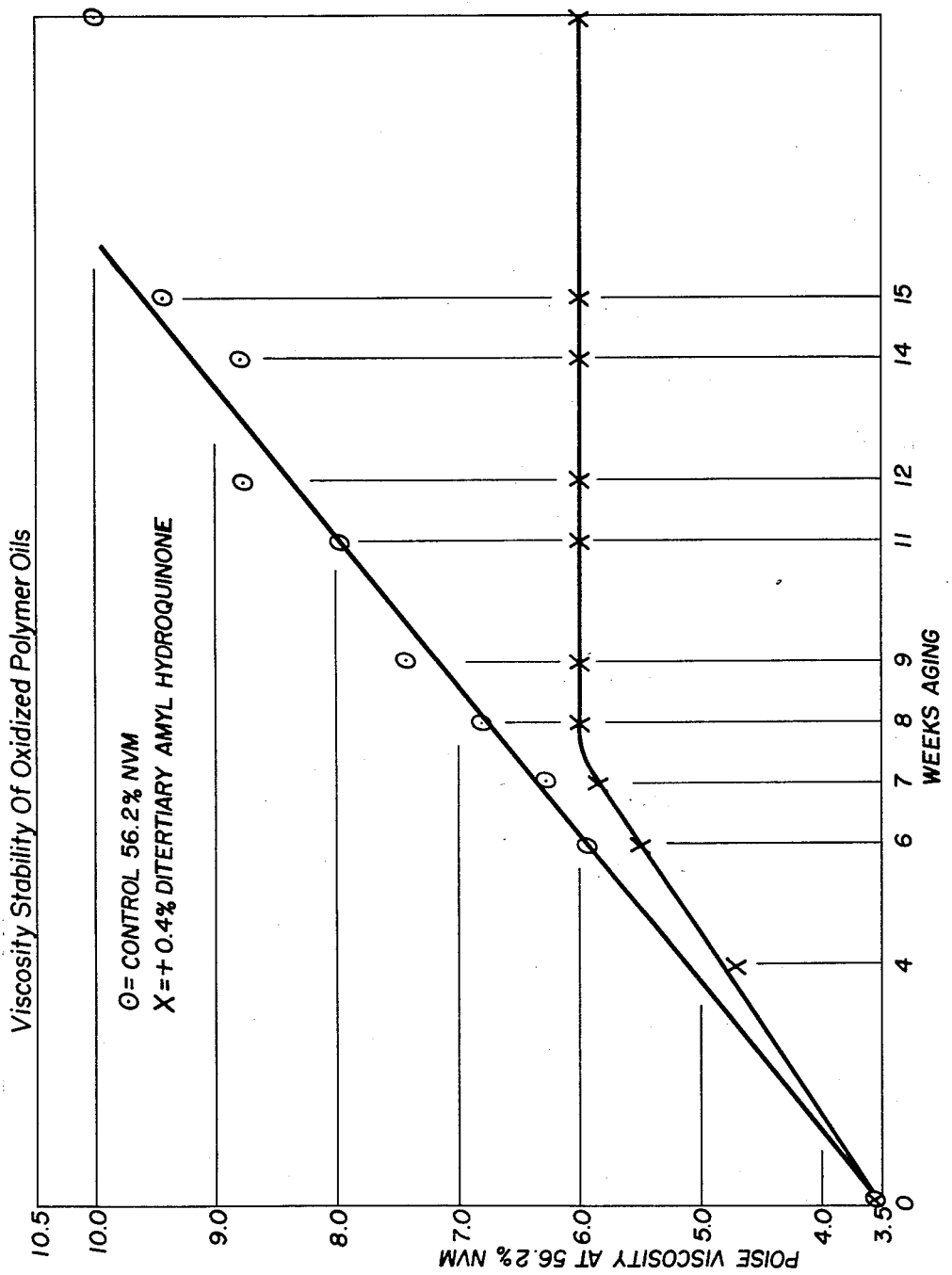
John F. McKay
Anthony H. Gleason  Inventors
By [signature] Attorney 2,942,996
Patented June 28, 1960

2,942,996

STABILIZING THE VISCOSITY OF OXIDIZED DRYING OILS

John F. McKay, Cranford, and Anthony H. Gleason, Westfield, N.J., assignors to Esso Research and Engineering Company, a corporation of Delaware Filed July 20, 1956, Ser. No. 599,052

7 Claims. (Cl. 106—285)

This invention relates to the preparation of oxidized synthetic drying oils and more particularly relates to a method for improving the handling characteristics of oxidized hydrocarbon drying oils and for stabilizing the viscosity of these oils.

Synthetic drying oils can be prepared by various methods from butadiene alone or from mixtures containing butadiene together with materials copolymerizable therewith. Sodium polymerization, emulsion polymerization as well as bulk polymerization in the presence of a diluent and a peroxide type catalyst have been used for this purpose with varying degrees of success. However, among the difficulties encountered with various synthetic drying oils were poor drying rate, poor flexibility, poor adhesion of air-dried coatings, poor wetting properties and consequent difficulty of grinding in pigments, poor gloss and streakiness of brushed enamel films. And while some of these disadvantages have been overcome in the past, this usually resulted in aggravation of other undesirable characteristics. In general the sodium catalyzed polymers have been found to be most economical to produce and to have a good drying rate but at the same time this type of drying oil was found to have particularly poor pigment wetting power and enamels prepared therefrom gave dull and very streaky films by brushing. Also they were difficult to cure in films of 2 or more mils thickness.

Most of these disadvantages can be overcome by oxidizing the oily copolymer by blowing with air or oxygen in the presence of an aromatic solvent and a catalyst such as a small amount of a metal naphthenate or other drier. These oxidized oils contain up to about 20% oxygen and have improved pigment-wetting characteristics and baking properties. However, the oxidized product has very poor viscosity stability, often becoming too viscous to handle in a very short time.

It has now been discovered that the difficulties inherent in the oxidized product can be circumvented by adding a small amount of ditertiary amyl hydroquinone to the oxidized oil. Ordinarily the viscosity of the oxidized oil continues to increase until the whole mass has gelled. However, when the hydroquinone is added, the oxidized oil increases in viscosity for a short time and then levels off.

The synthetic drying oils to which this invention applies are obtained by copolymerizing 60 to 100 parts of a conjugated diolefin hydrocarbon of 4 to 6 carbon atoms such as butadiene-1,3 with 40 to 0 parts of a vinyl aromatic hydrocarbon such as styrene, preferably about 75 to 85 parts of the former and 25 to 15 parts of the latter, the polymerization being carried out at 20° to 100° C., preferably below the melting point of the catalyst or between 65° and 85° C., in a reaction diluent. Temperatures near the lower end of the range set forth are generally more suitable for batch polymerizations and temperatures near the upper end of the range are particularly suited for continuous operation. As a polymerization catalyst about 0.1 to 10 parts, preferably about 1 to 3 parts of a finely dispersed alkali metal such as sodium, potassium, lithium, rubidium and caesium is used in the optional presence of various polymerization modifiers which tend to promote the reaction and produce colorless products of more exactly reproducible drying rates. As reaction diluent it is desirable to use, for example, a naphtha having a boiling range between about 90° and 120° C. or straight run mineral spirits such as Varsol (boiling range 150° to 200° C.) inert hydrocarbon diluents such as butane, xylene, benzene, toluene, cyclohexane or the like, individually or in admixture with each other. To be suitable for the polymerization reaction here involved, the diluents should have a boiling range within the limits of about −15° C. and 200° C. The diluents are usually in amounts ranging from 50 to 500, preferably 200 to 300 parts per 100 parts of monomers.

Instead of using inert diluents, it is also possible to use modifying diluents such as butene-2 or other low boiling olefins which modify the reaction by limited copolymerization and chain termination. Various ethers having more than two carbon atoms per molecule such as diethyl ether, dioxane, vinyl ethyl ether, vinyl isopropyl ether, vinyl isobutyl ether, ethylal, acetal and other ethers of various types are also useful as diluents and are particularly helpful as co-diluents to insure formation of colorless products when used in amounts ranging from about 10 to 35 parts per 100 parts of monomers, together with the aforesaid amount of inert diluent such as solvent naphtha. In selecting the ether co-diluent it is especially desirable to select an ether having a boiling point at least 10° C. below the lower limit of the boiling range of the hydrocarbon diluent and thus, when using Varsol, ether co-diluents boiling between about 25° and 140° C. are preferred in order to permit their ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-akylated homologues such as the various methyl styrenes, dimethyl styrenes, ethyl styrenes or diethyl styrenes. In practice it is desirable to add the styrene monomer to the reaction mixture only after the polymerization of the butadiene has been initiated. This expedient avoids the formation of polystyrene or copolymers rich in styrene since the styrene is the more active monomer and not as susceptible to the inhibiting action of impurities.

Especially where a coarse dispersion of alkali metal used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 100° C. with a catalyst particle size of less than 100 microns diameter. While sodium is preferred, similar catalysts such as potassium, sodium hydride, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations.

Destruction of catalyst at the end of the reaction is effectively accomplished by adding to the reactor a moderate excess of alcohol, e.g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer, and the neutralized product is then filtered with a filter aid such as silica gel, clay, charcoal or its equivalent. Acetic acid may also be used without any alcohol.

The clear filtered polymer oil thus obtained is oxidized by blowing air or oxygen into a tube or vertical tank containing the polymer. Where Varsol or other non-aromatic solvent is employed in the polymerization step, the filtered polymer oil solution is preferably stripped until substantially free of low-boiling material, followed by addition of aromatic type solvent for the subsequent oxidation step. The air or oxygen is introduced through a porous thimble or distributing plate near the bottom of the tank so as to afford maximum introduction of oxygen into the polymer, the temperature is maintained at 20° to 150° C. and the blowing is continued from 1 hour up to 4 days.

The blowing of the polymeric drying oils is best carried out in a solvent of moderate to good solvency, e.g., solvents or solvent mixtures having a Kauri Butanol value of at least 40. At least a substantial portion of aromatic solvent is generally needed to secure such a KB value, and such aromatic content is highly beneficial in promoting oxygen up-take during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low Kauri Butanol value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of Kauri Butanol value and compatibility with the various ingredients of the finished coating vehicle which is to be formulated. Examples of suitable solvents include aromatic or mixtures of aromatic and aliphatic hydrocarbons boiling up to about 250° C. The aromatic solvent may be xylenes, Solvesso 100, a mixture of aromatic hydrocarbons boiling from about 150° to 175° C., Solvesso 150, a mixture of aromatic hydrocarbons boiling from about 190° to 210° C. or mixtures thereof. Other suitable solvents include the Varsols which are straight run mineral spirits boiling in the range of 140° to 205° C., having API gravities of 40 to 55 and varying in aromatic content from 5 to 35 wt. percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in less solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is soluble in aromatic solvents indicating that the oxidation has proceeded to a high degree. The percent of oxygen in the product will vary according to the conditions from a trace to 20% or more.

According to this invention, a liquid polymer resulting from an alkali metal catalyzed polymerization is prepared and oxidized as described above and about 0.2 to 1% of ditertiary amyl hydroquinone is then added to the oxidized product to stabilize the viscosity.

The following specific example is presented to illustrate typical applications and effects of the present invention. All quantities are expressed in this specification and claims on a weight basis unless stated otherwise.

EXAMPLE I

A butadiene-styrene drying oil was prepared from the following charge:

| | Parts |
|---|---|
| Butadiene-1,3 | 80 |
| Styrene | 20 |
| Varsol[1] | 200 |
| Dioxane | 40 |
| Isopropanol | 0.2 |
| Sodium[2] | 1.5 |

[1] Straight run mineral spirits; API gravity 49.0; flash, 105° F.; boiling range, 150 to 200° C.; solvent power, 33–37 Kauri-Butanol value (reference scale: benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% non-volatile matter as described in earlier parts of this specification. The resulting product had a viscosity of 0.7 poise at 50% N.V.M.

The oil thus obtained was dissolved in xylene to 56% N.V.M. and blown with air at about 250° F. until the oxygen content reached 8.2% by weight based on polymer. The viscosity had increased to about 3.55 (equivalent to 1.15 poise at 50% N.V.M.).

0.2 to 0.4 wt. percent of various inhibitors (based on solids) was then added to aliquot portions of the oxidized oil. The samples were stored in glass in the dark with very little air space in the containers. Gardner viscosities were determined periodically. The data listed in Table I and plotted in Figure 1 clearly show the beneficial effect of di-tert. amyl hydroquinone in stabilizing the viscosity of the oil. They also show that color is not degraded nor is film hardness reduced. Other oxidation inhibitors tried do not work.

Table 1.—Viscosity stability of oxidized polymer oil 1 with added inhibitors

| Sample No. | Wt. percent | Additive | Gardner Color | Poise Viscosity after aging | | | | | | | | | | | Sward Hardness of films [2] |
| --- | --- | --- | --- | --- | --- | --- | --- | --- | --- | --- | --- | --- | --- | --- | --- |
| | | | | Original | 4 wks. | 6 wks. | 7 wks. | 8 wks. | 9 wks. | 11 wks. | 12 wks. | 14 wks. | 15 wks. | 20 wks. | |
| 1 | | None (Control) | 4 | 3.55 | 5.25 | 6.03 | 6.3 | 6.9 | 7.5 | 8.1 | 8.8 | 8.8 | 9.5 | 10.1 | 21 |
| 2 | 0.4 | di-tert. amyl hydroquinone | 4 | 3.55 | 4.8 | 5.5 | 5.9 | 6.03 | 6.03 | 6.03 | 6.03 | 6.03 | 6.03 | 6.03 | 26 |
| 3 | 0.2 | phenyl beta naphthylamine | 7 | 3.55 | 5.9 | | | | | | | | | | 26 |
| 4 | 0.2 | diphenyl-p-phenylene-diamine | 17 | 3.55 | 6.03 | 6.9 | | | | | | | | 11.8 | 28 |
| 5 | 0.4 | heptylated diphenyl amine | 8 | 3.55 | 6.8 | 7.5 | | | | | | | | 11.4 | 30 |
| 6 | 0.2 | Bis(2-hydroxy, 3-t.butyl, 6-methyl phenyl) sulfide | 4 | 3.55 | 5.5 | 6.03 | 6.3 | 7.5 | | | | | | 8.8 | 22 |

[1] 8.2% Oxygen. 56% NVM.
[2] Films cast immediately after adding inhibitors. Cured 30 minutes at 300° F.

The nature of the present invention having been thus fully set forth and a specific example of the same given, what is claimed as new and useful and desired to be secured by Letters Patent is:

1. A composition having a stable viscosity consisting essentially of 100 parts by weight of an oxidized drying oil, said oxidized drying oil being prepared by polymerizing a mixture of from 75 to 100 parts by weight of butadiene-1,3 and 25 to 0 parts by weight of styrene in the presence of about 1 to 5 parts by weight of finely divided alkali metal catalyst at a temperature between about 40 and 85° C. and blowing the resulting drying oil with an oxygen-containing gas at a temperature between about 20 and 150° C. until the oil contains from a trace up to 20 wt. percent combined oxygen, about 50 to 300 parts by weight of an aromatic hydrocarbon diluent and 0.2 to 1 part by weight of ditertiary amyl hydroquinone dissolved in said diluent.

2. A composition according to claim 1 in which the drying oil contains from about 8 to 20 wt. percent combined oxygen.

3. A composition having a stable viscosity consisting essentially of 100 parts by weight of an oxidized drying oil, said oxidized drying oil being prepared by polymerizing a mixture of from 75 to 100 parts by weight of butadiene-1,3 and 25 to 0 parts by weight of styrene in the presence of about 1 to 5 parts by weight of finely divided alkali metal catalyst at a temperature between about 40 and 85° C. and blowing the resulting drying oil with an oxygen-containing gas at a temperature between about 20 and 150° C. until the oil contains from a trace up to 20 wt. percent combined oxygen, about 50 to 150 parts by weight of an aromatic hydrocarbon diluent and 0.2 to 1 part by weight of ditertiary amyl hydroquinone dissolved in said diluent.

4. A composition according to claim 3 in which the drying oil contains from 8 to 20 wt. percent combined oxygen.

5. A process for stabilizing the viscosity of an oxidized drying oil, said oxidized drying oil being prepared by polymerizing a mixture of from 75 to 100 parts by weight of butadiene-1,3 and 25 to 0 parts by weight of styrene in the presence of 1 to 5 parts by weight of finely divided alkali metal catalyst at a temperature between 40 and 85° C. and blowing the resulting drying oil with an oxygen-containing gas at a temperature between about 20 and 150° C. until it contains from a trace to 20 wt. percent combined oxygen, which comprises adding 0.2 to 1 part by weight of ditertiary amyl hydroquinone to 50 to 300 parts by weight of an aromatic hydrocarbon diluent having dissolved therein 100 parts by weight of said oxidized drying oil.

6. Process according to claim 5 in which the solvent contains at least 5 wt. percent aromatic hydrocarbon and has a Kauri-Butanol value of at least 40.

7. A process for stabilizing the viscosity of an oxidized drying oil, said oxidized drying oil being prepared by polymerizing a mixture of from 75 to 100 parts by weight of butadiene-1,3 and 25 to 0 parts by weight of styrene in the presence of 1 to 5 parts by weight of finely divided alkali metal catalyst at a temperature between 40 and 85° C. and blowing the resulting drying oil with an oxygen-containing gas at a temperature between about 20 and 150° C. until it contains from a trace to 20 wt. percent combined oxygen, which comprises adding 0.2 to 1 part by weight of ditertiary amyl hydroquinone to 50 to 150 parts by weight of an aromatic hydrocarbon diluent having dissolved therein 100 parts by weight of said oxidized drying oil.

References Cited in the file of this patent

UNITED STATES PATENTS

| | | |
| --- | --- | --- |
| 2,429,582 | Morris et al. | Oct. 21, 1947 |
| 2,455,746 | Erickson | Dec. 7, 1948 |
| 2,648,640 | Block | Aug. 11, 1953 |
| 2,672,425 | Gleason | Mar. 16, 1954 |
| 2,674,586 | Welch | Apr. 6, 1954 |
| 2,687,442 | Claver | Aug. 2, 1954 |

FOREIGN PATENTS

| | | |
| --- | --- | --- |
| 741,716 | Great Britain | Dec. 7, 1955 |
| 595,854 | Great Britain | Dec. 18, 1947 |

OTHER REFERENCES

Kluchesky et al.: Journal Ind. & Eng. Chem., 41, 1768–71, 1949.

Bickoff: Journal Am. Oil Chemists' Soc., 28, 65–8, 1951.